US006918171B2

(12) United States Patent
Kucera et al.

(10) Patent No.: US 6,918,171 B2
(45) Date of Patent: Jul. 19, 2005

(54) METHOD OF MANUFACTURING MOLDED COMPONENTS

(75) Inventors: Jeffrey R. Kucera, Parma, OH (US); Kenneth Ray Smith, Medina, OH (US)

(73) Assignee: MTD Products Inc, Valley City, OH (US)

(*) Notice: Subject to any disclaimer, the term of this patent is extended or adjusted under 35 U.S.C. 154(b) by 0 days.

(21) Appl. No.: 10/681,429

(22) Filed: Oct. 8, 2003

(65) Prior Publication Data

US 2004/0194282 A1 Oct. 7, 2004

Related U.S. Application Data

(60) Provisional application No. 60/416,995, filed on Oct. 8, 2002.

(51) Int. Cl.[7] .................................................. B23P 19/02

(52) U.S. Cl. .......................... 29/525; 29/469; 29/897.2; 180/69.2; 296/193.11

(58) Field of Search .......................... 29/525, 469, 428, 29/897.2; 180/69.2; 296/193.11

(56) References Cited

U.S. PATENT DOCUMENTS

| | | | | |
|---|---|---|---|---|
| 3,688,856 A | | 9/1972 | Boehm et al. | |
| 5,535,846 A | | 7/1996 | Kurtz, Jr. et al. | |
| 5,782,312 A | * | 7/1998 | Murakawa | 180/69.2 |
| 6,167,977 B1 | * | 1/2001 | Adamson et al. | 180/69.2 |
| 6,202,777 B1 | * | 3/2001 | Surridge | 180/68.1 |
| 6,447,152 B1 | | 9/2002 | Goebert | |
| 6,684,616 B2 | * | 2/2004 | Hornung | 56/16.7 |

* cited by examiner

*Primary Examiner*—Essama Omgba
(74) *Attorney, Agent, or Firm*—Wegman Hessler & Vanderburg

(57) ABSTRACT

A method of manufacturing injection-molded components having complex features is disclosed. Prior methods typically require the use of a three-piece mold system to form an injection molded component having a complex feature, such as a lawn mower hood having a parabolic shaped front. With the development of a new rigid type of reflective material the present method can thereby utilize a two-piece mold system to form an injection molded component having complex features such as a lawn mower hood having a C-shaped open cavity located at the front of the hood.

11 Claims, 8 Drawing Sheets

(PIOR ART)

(PIOR ART)

(PIOR ART)

(PIOR ART)

(PIOR ART)

METHOD OF MANUFACTURING MOLDED COMPONENTS

This application claims priority from U.S. provisional patent application Ser. No. 60/416,995, entitled METHOD OF MANUFACTURING MOLDED COMPONENTS, filed Oct. 8, 2002.

I. BACKGROUND OF THE INVENTION

A. Field of Invention

This invention pertains to apparatuses and methods in manufacturing injection-molded components as well as apparatuses and methods in manufacturing vehicle light fixtures. More specifically, this invention pertains to apparatuses and methods concerning the injection molding process for lawn tractor hoods and to apparatuses and methods related to head lights mounted in lawn tractor hoods.

B. Description of the Related Art

The process of injection molding used to form molded components is well known in the art. In addition, it is well known that two or more mold components are typically used in the process of injection molding. More specifically, it is well known in the art that three or more molds or tools are required in the process of injection molding complex components. Such combinations of tools generally work well for their intended purpose. However, the use of multiple molds increases the costs involved in manufacturing such complex components.

An example of a complex component is illustrated in FIGS. 1–5. As can be observed from FIGS. 1–2, both an upper and lower mold are required to form the hood 10 there illustrated. In addition to the upper and lower mold, a third mold component or tool is also required in order to form the parabolic shape 12 (seen best in FIGS. 2–3) at the front of the hood (necessary for the headlight compartments). Once the upper and lower mold tools are in place to form the hood, the third mold tool or component is then inserted into the front to form the parabolic shape. The use of a three-component mold system is essential for this type of part because the formation of the parabolic shaped cavity would prevent the removal of the upper and lower mold pieces in a two-component system. The more mold-components required for the process, the more expensive the process becomes. Therefore, one disadvantage of the prior art is the use of such third components (or more than three components) in injection molding processes.

Another disadvantage of the known processes is related to the method of attaching the reflecting material into the parabolic shaped cavity at the front of the hood. The purpose of the reflective material is to increase the illumination of the headlights. This material is a flexible material having one side with a shiny reflecting material and a second side with an adhesive material used to adhere the reflecting material to the parabola shape cavity at the front of the hood. As can be seen by the deformation illustrated in FIGS. 4 and 5, the material is difficult to attach. In addition, this process and the time required to attach this material does not lend itself to an efficient manufacturing process. This too increases the cost of the manufacturing process.

The present invention provides methods and apparatuses for forming a complex molded component (such as a hood) using only two mold portions or tools. The difficulties inherent in the related art are therefore overcome in a way that is simple and efficient, while providing better and more advantageous overall results.

II. SUMMARY OF THE INVENTION

The present invention addresses the disadvantages mentioned above. First, the development of a new more rigid type of reflective material allows the manufacturer to attach the material without the use of an adhesive while still maintaining the required parabola shape. This development further allows the use of a two-piece mold to form the tractor hood since the parabola shape cavity molded into the front of the hood is no longer required.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
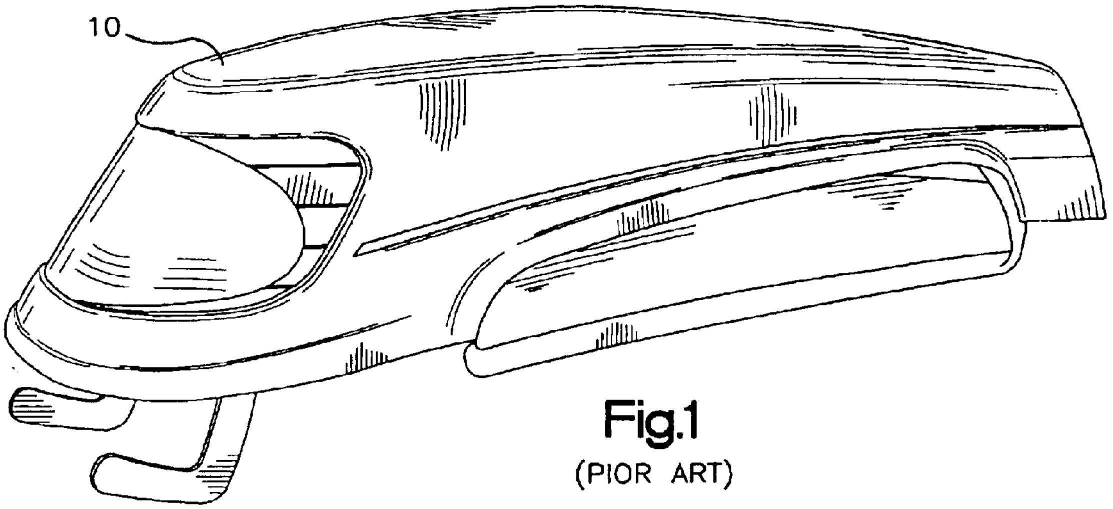
FIG. 1 is a side view of a lawn tractor hood made using the prior art method with a three part mold.
Figure 2:
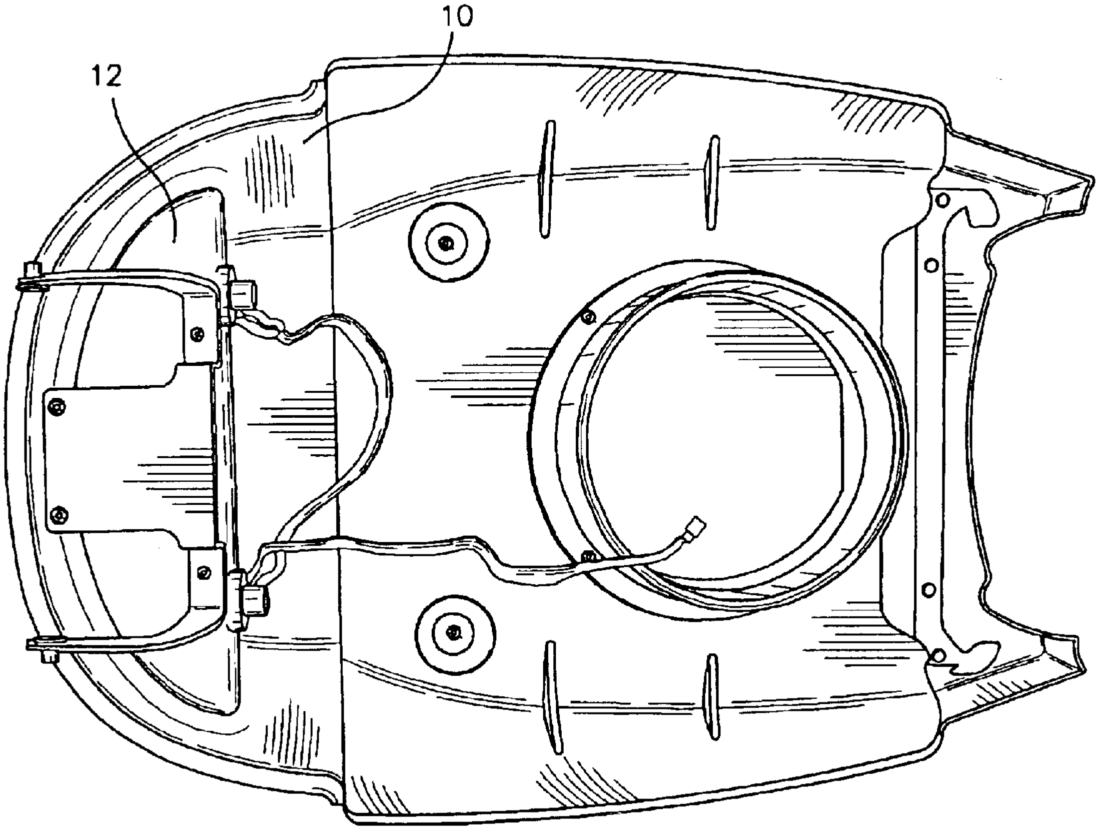
FIG. 2 is a bottom view of the prior art hood of FIG. 1.
Figure 3:
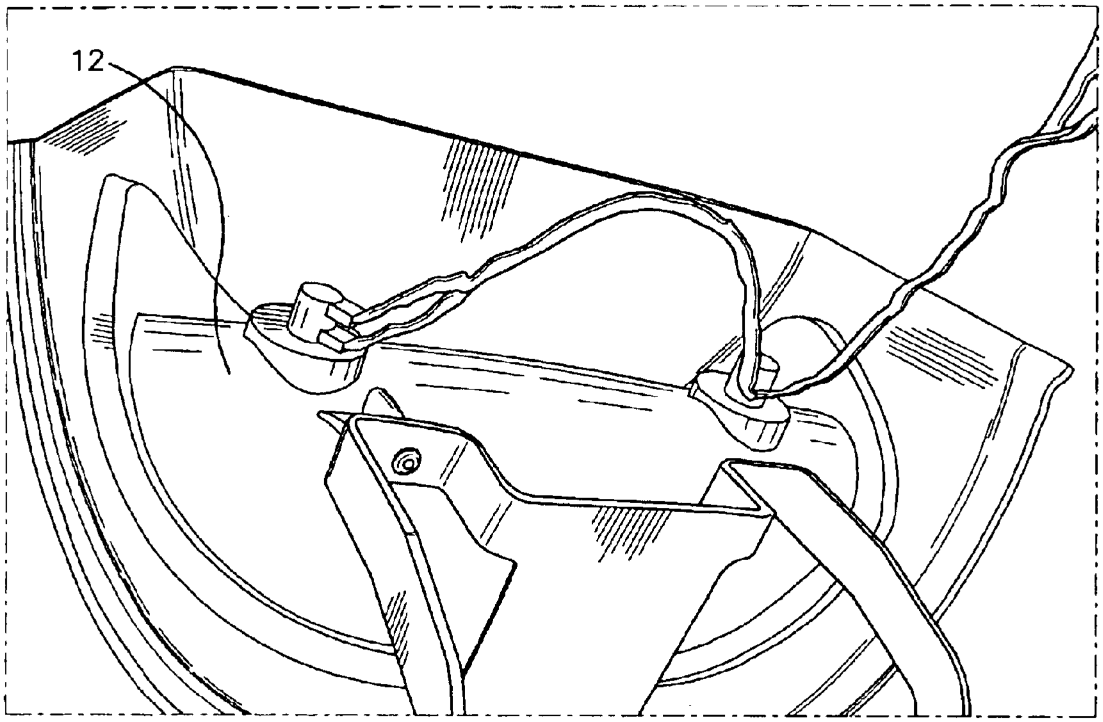
FIG. 3 is a perspective side view of the bottom surface of the prior art hood of FIG. 1 showing the parabola shaped cavity.
Figure 4:
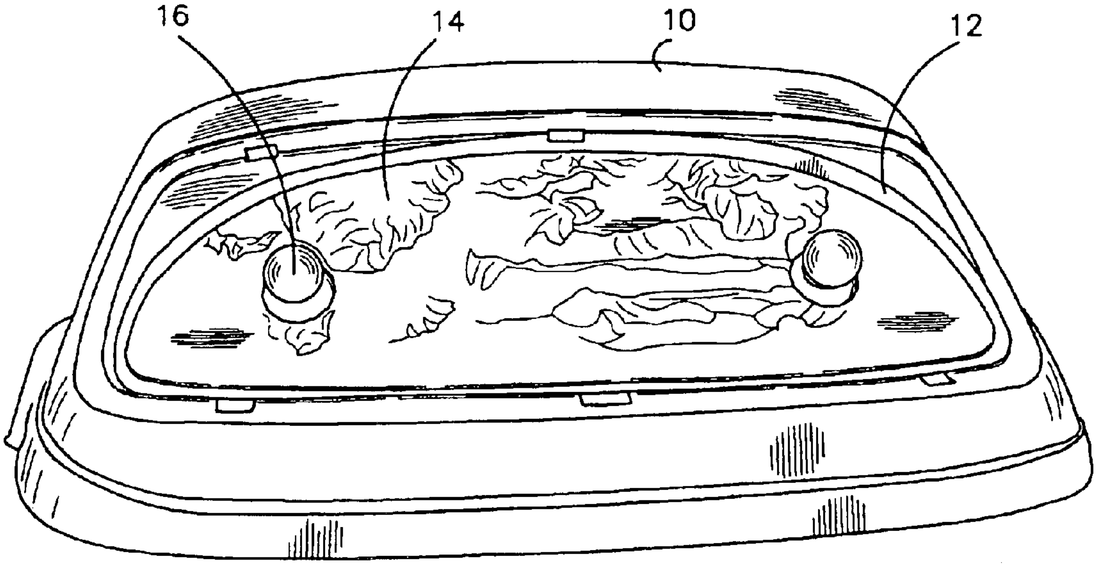
FIG. 4 is a front view of the prior art hood of FIG. 1.
Figure 5:
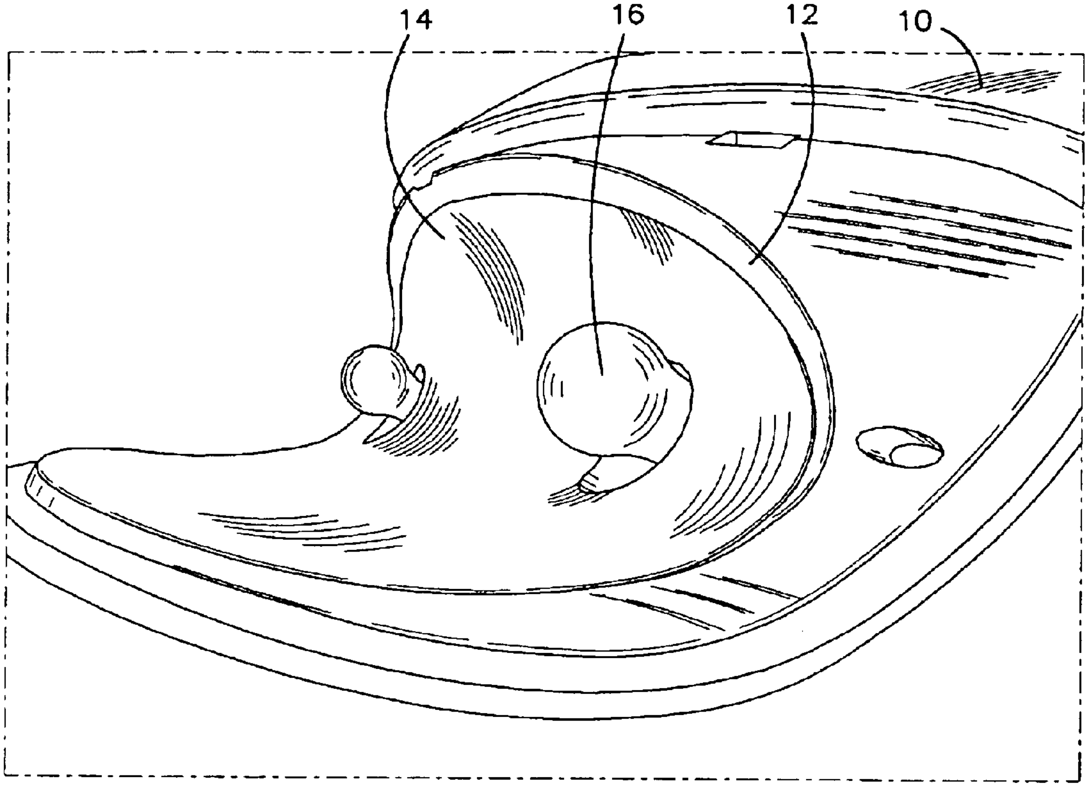
FIG. 5 is a side view of the parabola shaped cavity located at the front of the prior art hood of FIG. 1.
Figure 6:
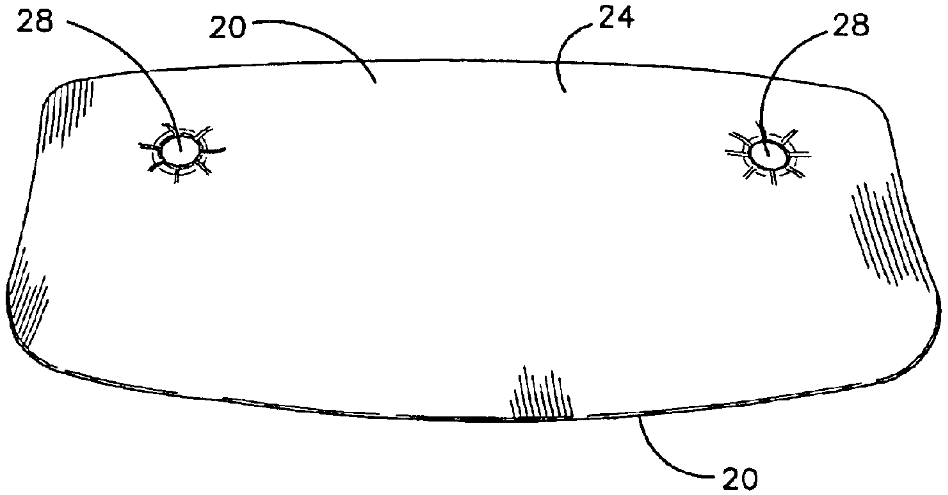
FIG. 6 is a top view of the inventive reflective material shown in a flat orientation prior to being formed into a parabolic shape.

The present invention provides for a molding process that utilizes only two mold components (or tools) capable of producing a relatively large component having complex features. This process is best described by comparing the method of the prior art versus the method of the present invention. Referring to the prior art in FIGS. 1–5, a complex molded component, more specifically, a lawn tractor hood 10 formed by a three-piece mold is shown. It should be noted that the present invention can be used for other types of complex molded components used with sound engineering judgment. The lawn mower hood 10 used here is for the purpose of illustration. FIGS. 2, 3 and 5 specifically show the parabolic shaped cavity 12 located at the front of the hood 10. The purpose of this cavity 12 is to create a parabolic shaped surface upon which a reflective material 14 can be adhesively placed. The parabolic shape is well known in the field of headlights to provide the proper light reflective properties for the headlights 16. (Since these light reflective properties are well known in the art, further detail will not be provided here.) However, the formation of the parabolic shaped cavity 12 requires the use of a three-mold component in the injection molding process. Therefore, the first aspect of this invention is a method of placing a reflective material over the light bulbs and into the front of the hood wherein the reflective material maintains a parabolic shape without the need for a parabolic shaped cavity formed in the front of the hood to support the reflective material.

The inventive reflective material 20 is shown in FIGS. 6–10. The reflective material 20 has a certain degree of flexibility to allow the installer the ability to bend the material and insert it into the front of the hood 30. The resulting hood of the present invention is shown in FIGS. 11–16. The reflective material 20 also has a certain amount of rigidity that allows it to maintain a parabolic shape 22 after it has been installed in the hood 30. The front side 24 of the material 20 preferably has a mirror-like material or surface designed to increase the illumination of the headlights 32 of the vehicle. The back 26 of the material is preferably opaque. The reflective material may have a pair of holes 28. Each hole 28 receives one head light as will be described below.

Figure 11:
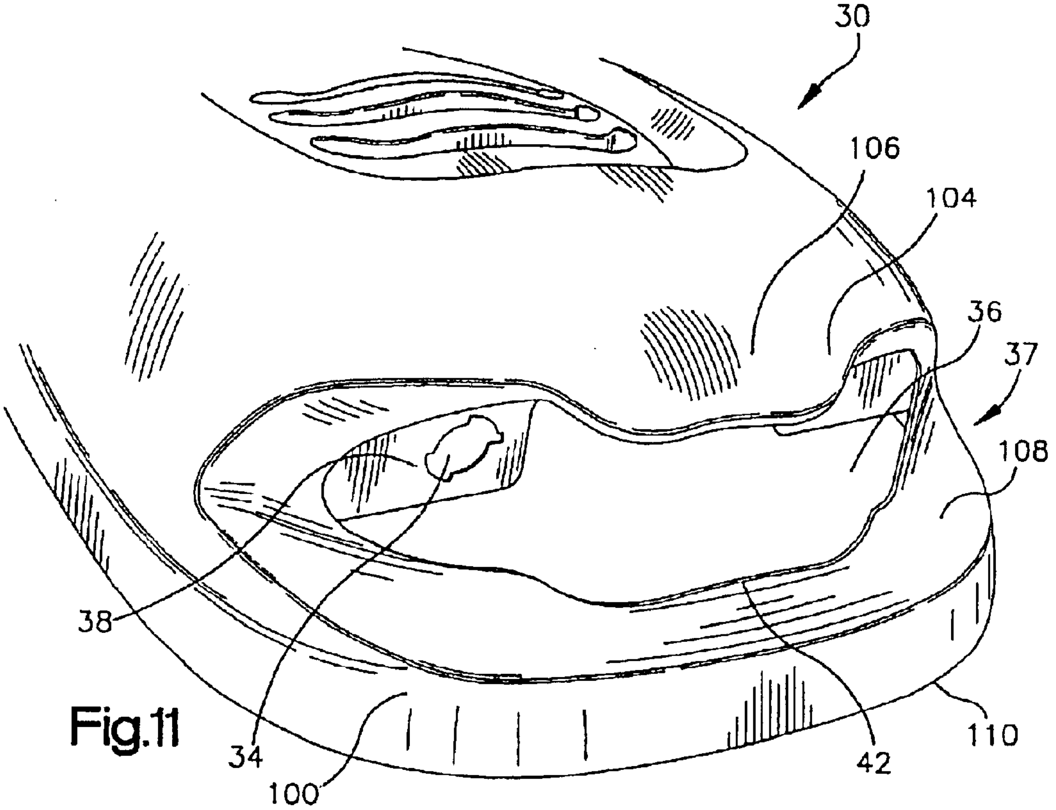
FIG. 11 shows a front view of the hood of the present invention without the insertion of the reflective material.
Figure 12:
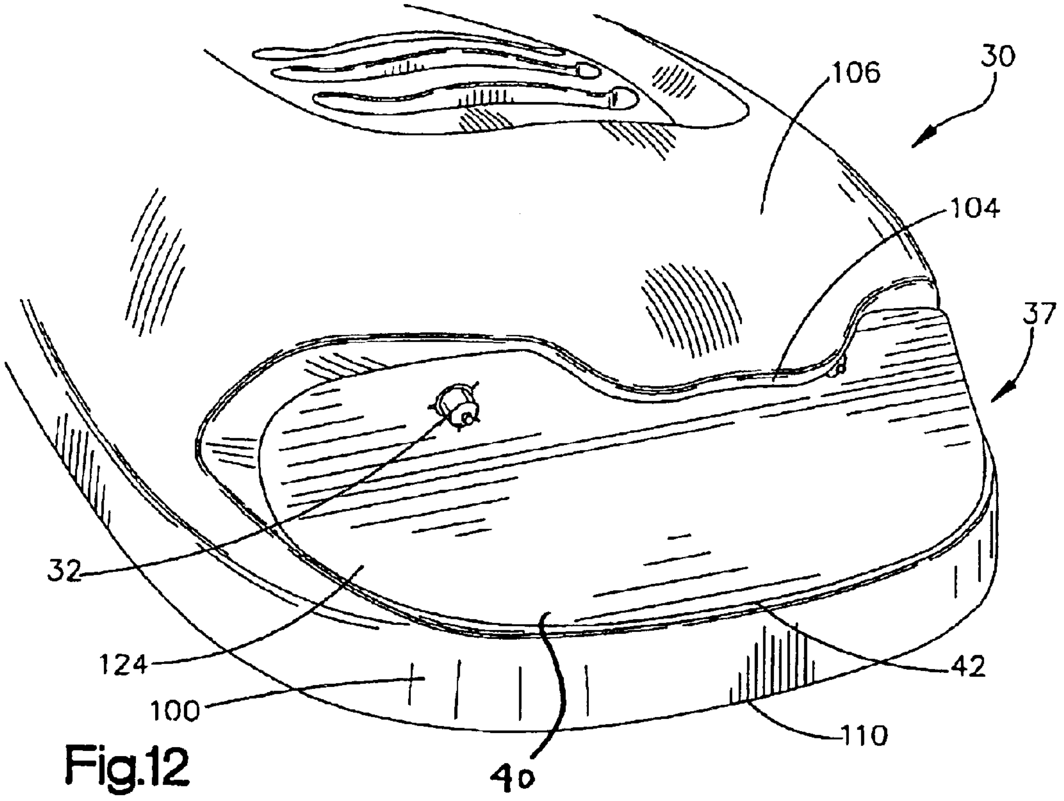
FIG. 12 shows a front view of the hood of the present invention with the insertion of the reflective material.
Figure 13:
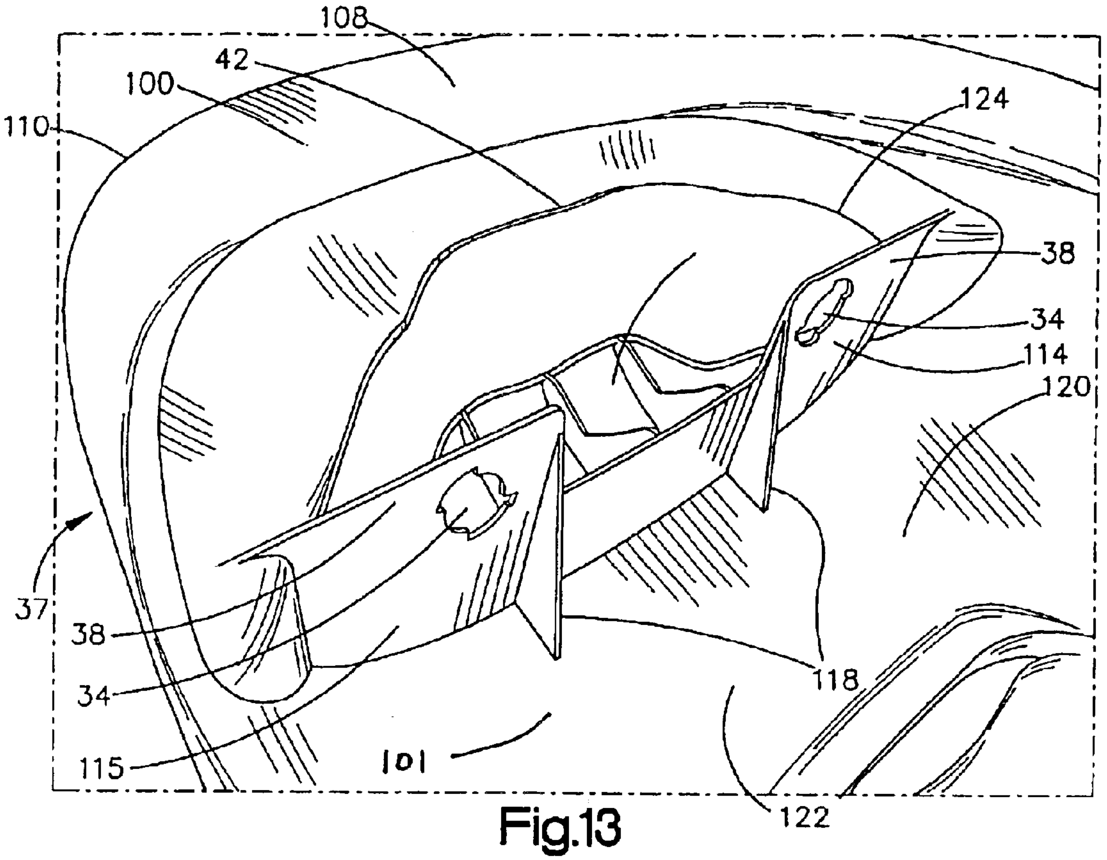
FIG. 13 shows the inside view of the front of the hood of the present invention without the reflective material.
Figure 14:
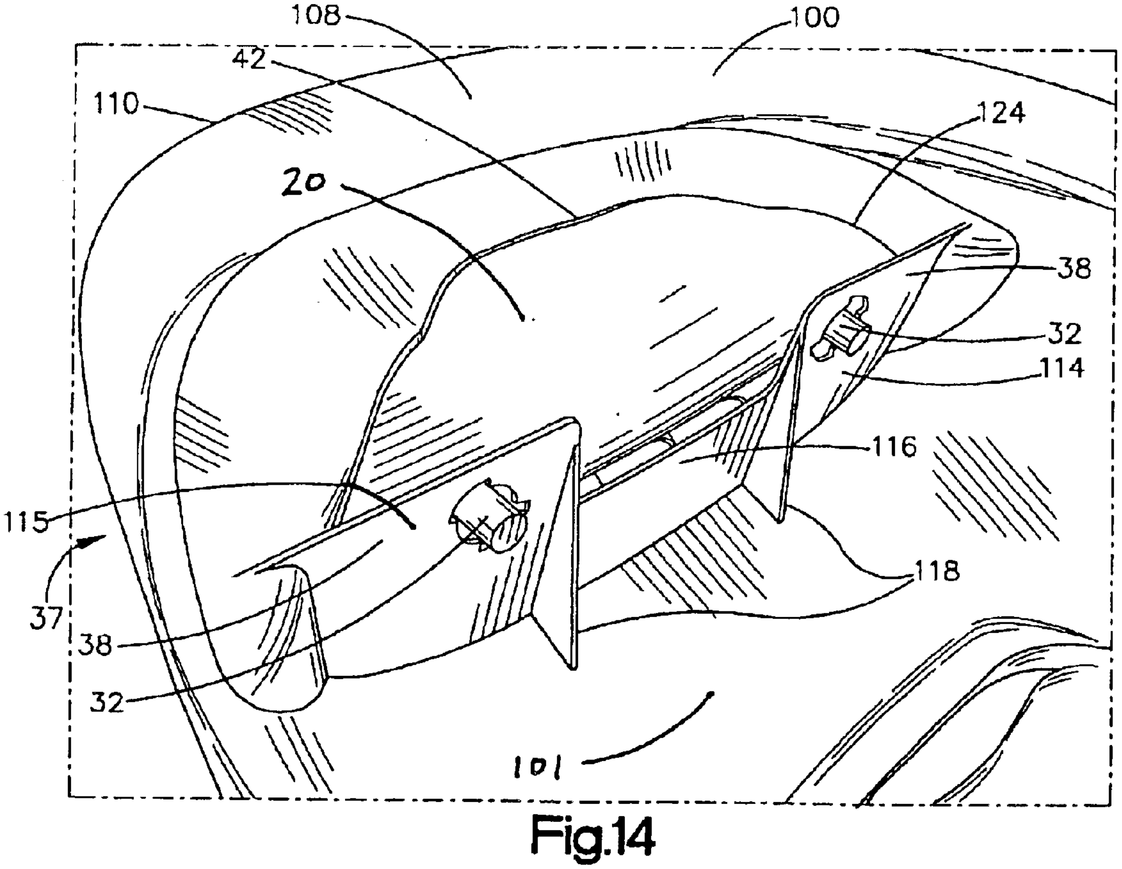
FIG. 14 shows an inside view of the front of the hood of the present invention with the insertion of the reflective material.

FIGS. 11–14 show the preferred embodiment with and without the reflective material 20 of the present invention inserted. FIGS. 11 and 13 illustrate that the parabolic shaped cavity 12 of FIGS. 1–5 is no longer required to place the reflective material 20 over the headlights 32. In the preferred embodiment, the headlights 32 are simply inserted through holes 34 in the headlight flange 38 as illustrated in FIGS. 12 and 14. The process of attaching and connecting the headlights onto a headlight flange 38 can be by any known process chosen with sound engineering judgment. Options include using a pressure fit, a snap fit, threads permitting the headlights to be screwed into the flange 38, and the use of a "plugged in" connection with a receptacle. In the preferred embodiment, the headlight 32 is first placed within a socket (not shown) that has tabs. The socket is then extended into the hole 34 and turned. This causes the tabs to lock the headlight 32 onto the flange 38. This embodiment is also known in the art and thus will not be described in detail.

With continuing reference to FIGS. 11–14, the reflective material 20 is inserted into a C-shaped open cavity 36 at the front 100 of the hood 30. The holes 28 in the reflective material 20 are placed over the headlights 32 and the reflective material 20 is pushed back toward the headlight flange 38 so that the headlights 32 protrude through the holes 28 in the reflective material 20. The installer continues to push the reflective material 20 back until the back 26 of the reflective material 20 is pressed against the headlight flange 38. Finally, the bottom portion 40 of the reflective material 20 is attached into place at the bottom 42 of the open cavity 36 at the front 100 of the hood 30. The bottom portion 40 of the reflective material 20 can be attached to the bottom 42 of the open cavity 36 by clamping, securing with tabs, inserting the material into a slot or by any means chosen with sound engineering judgment. The reflective material 20 is able to maintain its parabolic shape 22 due to the rigidity of the material. One advantage of this method is the simplicity and ease of placing the reflective material 20 into the open cavity 36 at the front 100 of the hood 30. This process reduces manufacturing costs, which in turn can be passed on to the consumer. Yet another advantage of this process is the elimination of the deformation in the reflective material 14 previously mentioned in the prior art above and illustrated in FIGS. 4 and 5. Finally, a third advantage of this method is the elimination of the parabolic shaped cavity 12 required in the front of the hood 10 thereby eliminating the need of a three-piece mold system for the injection mold process of the hood. This development leads us to the second aspect of the present invention, which is the utilization of a two-piece mold to form a complex molded component.

Figure 15:
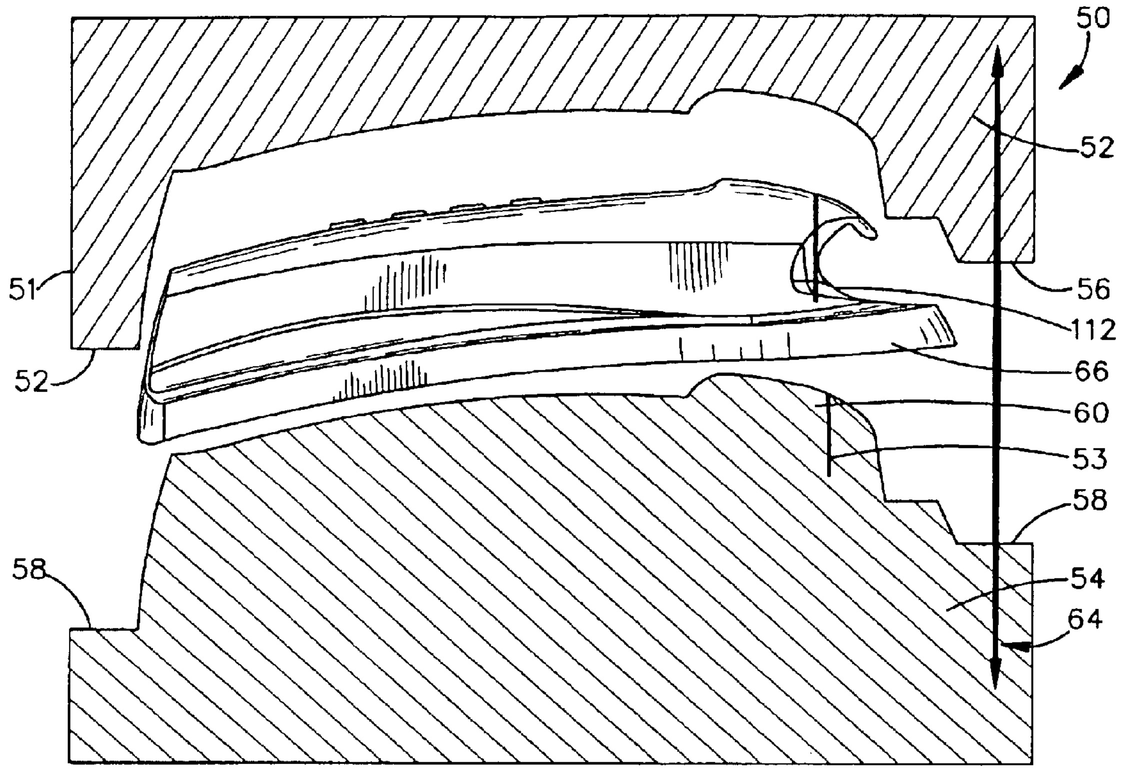
FIG. 15 shows a side view of the mold of the present invention in the open position.
Figure 16:
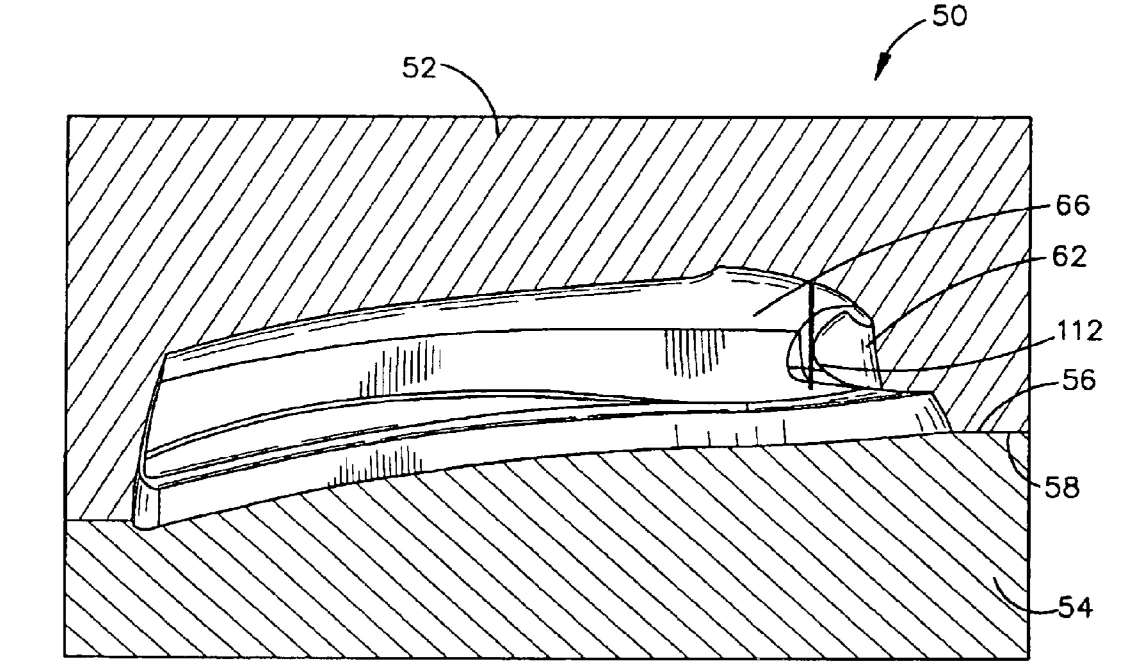
FIG. 16 shows a side view similar to that in FIG. 15 but showing the mold of the present invention in the closed position.

The second aspect of the present invention, which is the use of a two-piece mold arrangement 50 to form a complex molded component, will now be described. As noted above, complex molded components typically require a three-piece mold arrangement due to the complexity of the component. In the present embodiment the complex molded component consists of a lawn tractor hood 30 however, as previously mentioned, the present invention can be used for any type of complex molded component. The complexity of the lawn mower hood 30 can best be seen from FIGS. 11–16. The hood 30 contains a cavity 12 that extends from the front 100 of the hood 30 to the back 101 of the hood 30. Located near the front 100 of the hood 30 is a C-shaped open cavity 36 as shown in FIGS. 15 and 16. Typically a three piece mold arrangement is required to obtain the C-shaped cavity 36 or parabolic shape as mentioned above. The C-shaped cavity 36 is defined by an overhang 104 located at the top 106 of the hood 30, by an under-hang 108 located at the bottom 110 of the hood 30, and a periphery 124 that circumvents the cavity 36. Located at the rear 112 of the C-shaped cavity 36 is the headlight flange 38 as previously mentioned. The headlight flange further consists of two side sections 114, 115 and a center section 116. The side sections 114, 115 extend further down form the top 106 of the hood 30 than does the center section 116 as best shown in FIG. 13. The side sections 114, 115 further contain holes 34 to allow installation of the headlights 32 as previously described. As shown in FIGS. 13 and 14 the headlight flange further consists of two supports 118 to provide stability for the headlight flange 38. The supports 118 are operatively attached to the back of the headlight flange 38 and to the underneath side 120 of the top 106 of the hood 30. Referring to FIGS. 15 and 16, the mold required to form such a complex component consists of an upper portion 52 and a lower portion 54. The upper 52 and lower portions 54 of the mold system 50 further consist of contact surfaces 56, 58 that are abutted against each other when the mold 50 is in the closed position as illustrated in FIG. 16. The upper portion further contains a runner 51 whereby the molten resin is injected through and into the cavity of the mold. It should be noted that the runner 51 can be in any location of the mold chosen with sound engineering judgment. The lower portion 54 further consists of a top rounded portion 60. The top rounded portion 60 forms the C-shaped open cavity 36 near the front 100 of the hood 30. This can best be seen in FIG. 16 where the front 62 of the top round portion 60 is visible when the mold 50 is in the closed position. The top round portion 60 of the lower portion 54 further contains slots 53. The slots 53 extend vertically downward and allow the formation of the headlight flange 38, the headlight holes 34, and the supports 118. The headlight flange 38 is shown in FIGS. 11 and 13.

Figure 7:
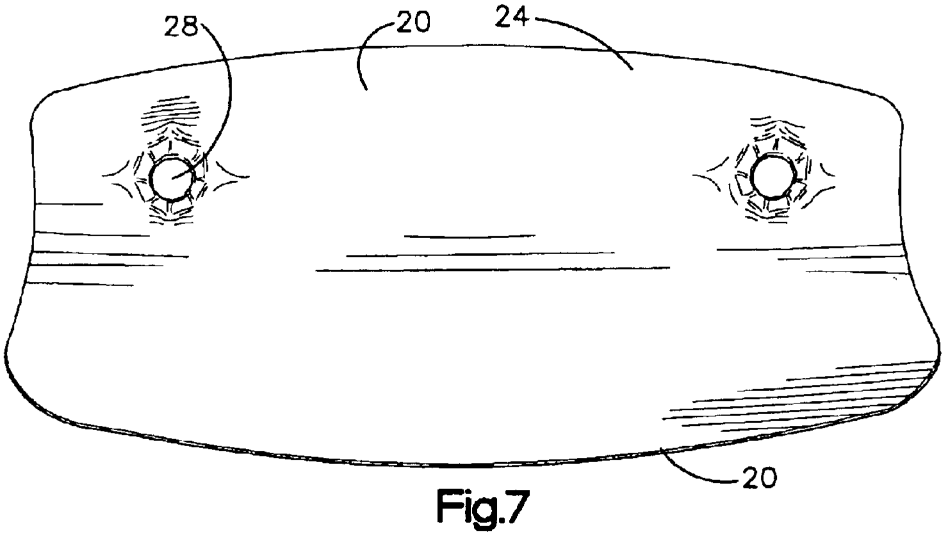
FIG. 7 is a top view of the inventive reflective material of FIG. 6 after the material has been formed into a parabolic shape.
Figure 8:
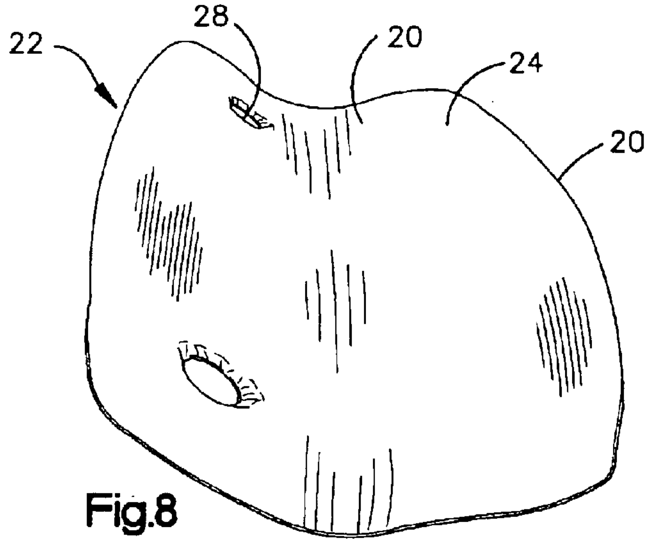
FIG. 8 is a side view of the inventive reflective material of FIG. 7.
Figure 9:
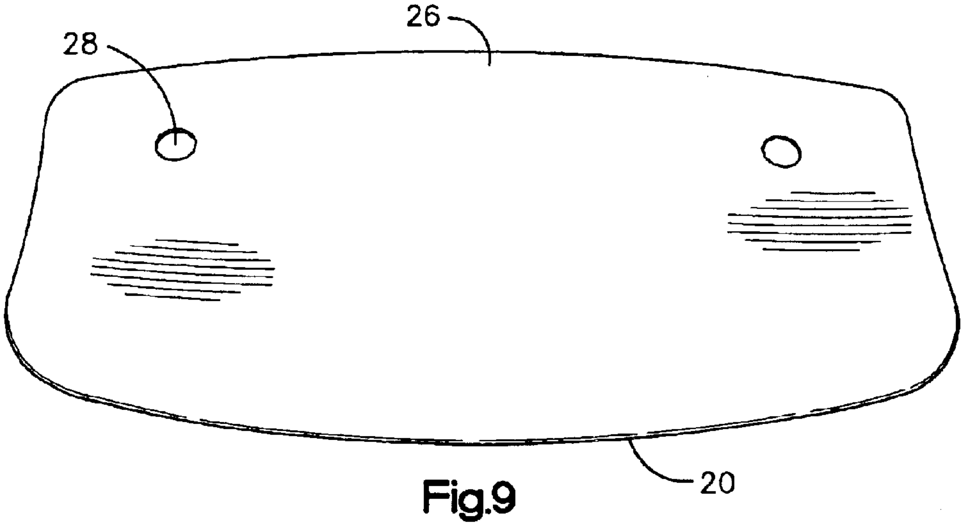
FIG. 9 is back view of the inventive reflective material of FIG. 6 in a pre-parabolic shape.
Figure 10:
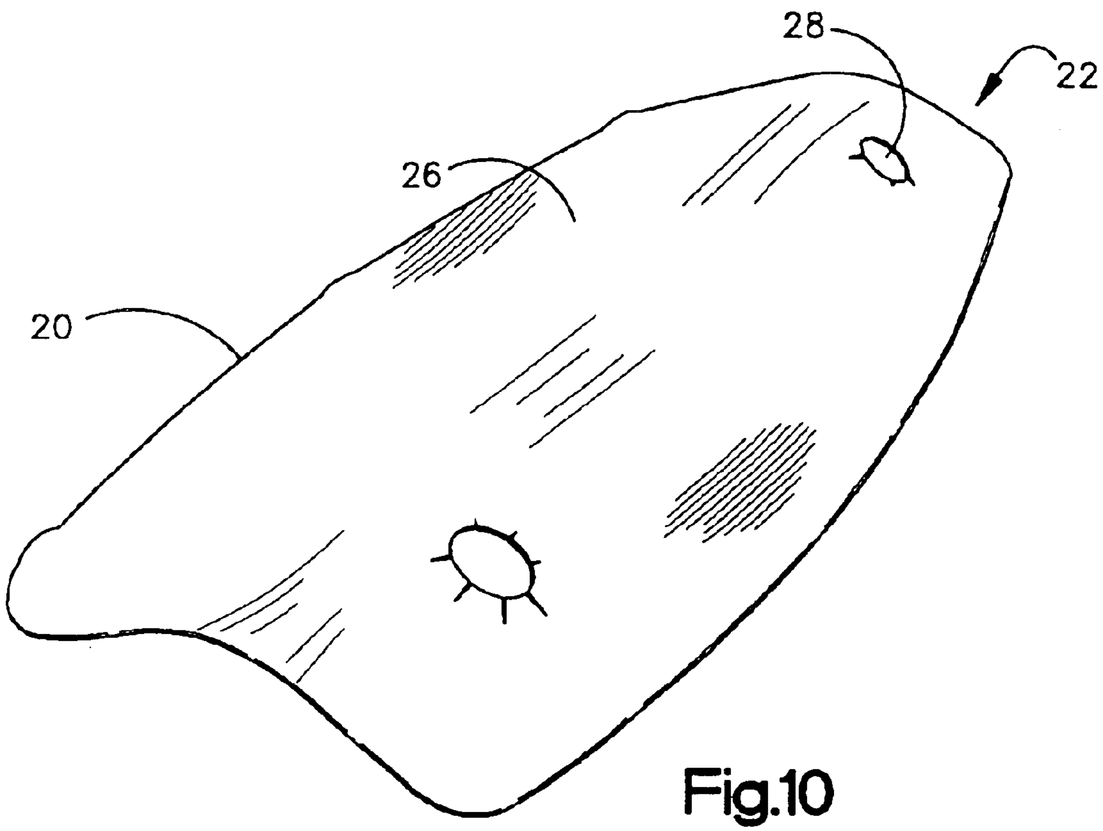
FIG. 10 is a side view of the inventive reflective material of FIG. 9 after the material has been formed into a parabolic shape.

Still referring to FIGS. 15 and 16, in performing the injection mold process, the upper portion 52 and lower portion 54 are abutted against each so that the contact surfaces 56 of the upper portion 52 and the contact surfaces 58 of the lower portion 54 are in contact with each other. In this position the mold 50 is in the closed position as illustrated in FIG. 16. An injection molten resin is injected through a runner 51 and into the hollow portion 68 of the mold to form a molded resin product while keeping the upper 52 and lower portions 54 abutted against each other. After the resin has cured inside the hollow portion 68, the upper 52 and lower portions 54 are moved away from each other in a direction indicated by the line of draw 64 as illustrated in FIG. 7. The molded component 66 is then removed from the mold 50 and the process is repeated.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A method of mounting a headlight fixture in a vehicle hood, the method comprising:

molding a vehicle hood with an open cavity therein, the open cavity defined by an overhang and an under-hang in the vehicle hood, the molded vehicle hood further comprising a headlight-mounting flange member extending substantially vertically down from an inside surface of the vehicle hood;

providing at least a first headlight and a flexible, semi-rigid reflective material having at least a first hole;

installing the at least first headlight to the headlight-mounting flange member such that the at least first headlight extends into the open cavity;

inserting the reflective material into the open cavity of the hood such that the at least first hole receives the at least first headlight; and folding the reflective material such that a first end of the reflective material attaches to the headlight-mounting flange and an opposite end of the reflective material attaches to the under-hang of the vehicle hood to form a curved surface positioned to reflect light from the at least first headlight out of the open cavity.

2. The method of claim 1 further comprising providing the reflective material as a flexible, semi-rigid material with an opaque back.

3. The method of claim 1 further comprising:

providing the open cavity of the hood with a periphery; and, positioning the reflective material such that at least a portion of the outer edge of the reflective material contacts at least a portion of the open cavity periphery.

4. The method of claim 3 wherein positioning the reflective material such that at least a portion of the outer edge of the reflective material contacts at least a portion of the open cavity periphery further comprises:

forming the reflective material into a parabolic shape.

5. The method of claim 3 further comprising:

molding the hood with a second flange member extending down from the inside surface of the vehicle hood at the rear of the open cavity and the reflective material with a second hole;

providing a second headlight;

installing the second headlight to the second flange member such that the second headlight extends into the open cavity;

inserting the reflective material into the open cavity of the hood such that the second hole receives the second headlight such that the reflective material reflects light from the first and second headlights out of the open cavity.

6. The method of claim 5 further comprising:

positioning the reflective material such that a portion of the back of the reflective material comes in contact with the second flange.

7. The method of claim 6 wherein positioning the reflective material such that a portion of the back of the reflective material comes in contact with the second flange further comprises the step of:

forming the reflective material into a parabolic shape.

8. The method of claim 1 wherein the headlight mounting flange member is a substantially planer member extending from the surface of the vehicle hood into the cavity.

9. The method of claim 1 wherein a distal end of the headlight mounting flange does not contact the under-hang of the hood such that the reflective material forms a curved surface from the headlight mounting flange to the under-hang.

10. A method comprising:

molding a vehicle hood with an open cavity and first and second headlight-mounting flange members extending down from an inside surface of the vehicle hood, wherein the open cavity further includes a periphery, an overhang and an under-hang;

providing first and second headlights and a semi-rigid reflective material having first and second holes and an opaque back;

installing the first and second headlights to the first and second flange member such that the first and second headlights extend into the open cavity; inserting the reflective material into the open cavity of the hood such that the first and second holes receive the first and second headlights respectively and the reflective material is properly positioned to reflect light from the first and second headlights through the open cavity;

positioning the reflective material such that a portion of the back of the reflective material comes in contact with the first and second flanges and at least a portion of the outer edge of the reflective material contacts at least a portion of the open cavity periphery; and forming the reflective material into a parabolic shape.

11. A method of mounting a headlight fixture in a vehicle hood, the method comprising:

molding a vehicle hood having an open cavity therein and a molded headlight mounting flange, the open cavity defined by an overhang and an under-hang in the vehicle hood and the headlight-mounting flange, wherein the headlight mounting flange extends substantially vertically down from an inside surface of the vehicle hood and is positioned at the rear of the cavity;

installing a headlight to the headlight-mounting flange such that the headlight extends into the open cavity;

inserting a semi-rigid, flexible reflective material with a headlight hole into the cavity, the reflective material being positioned such that the hole receives the headlight; and folding the reflective material such that a first end of the reflective material attaches to the headlight-mounting flange and an opposite end of the reflective material attaches to the under-hang of the vehicle hood to form a curved surface positioned to reflect light from the at least first headlight out of the open cavity.

* * * * *